United States Patent
Hua et al.

(10) Patent No.: US 12,304,172 B1
(45) Date of Patent: May 20, 2025

(54) MULTILAYERED FLUORESCENT WAFER FOR LASER LIGHTING AND DISPLAY, AND METHOD OF MANUFACTURING

(71) Applicant: China Jiliang University, Hangzhou (CN)

(72) Inventors: Youjie Hua, Hangzhou (CN); Zhanhao Fan, Hangzhou (CN); Hongping Ma, Hangzhou (CN); Renguang Ye, Hangzhou (CN); Ruoshan Lei, Hangzhou (CN); Feifei Huang, Hangzhou (CN); Degang Deng, Hangzhou (CN); Shiqing Xu, Hangzhou (CN)

(73) Assignee: China Jiliang University, Hangzhou (CN)

( * ) Notice: Subject to any disclaimer, the term of this patent is extended or adjusted under 35 U.S.C. 154(b) by 0 days.

(21) Appl. No.: 18/772,572

(22) Filed: Jul. 15, 2024

(30) Foreign Application Priority Data

Apr. 19, 2024 (CN) .......................... 202410481411.0

(51) Int. Cl.
  *B32B 17/06* (2006.01)
  *B32B 7/12* (2006.01)
  *B32B 15/20* (2006.01)
  *F21V 9/32* (2018.01)

(52) U.S. Cl.
  CPC .............. *B32B 17/061* (2013.01); *B32B 7/12* (2013.01); *B32B 15/20* (2013.01); *B32B 2457/20* (2013.01); *F21V 9/32* (2018.02)

(58) Field of Classification Search
  CPC . B32B 17/061; B32B 7/12; F21V 9/32; F21V 7/26; F21V 7/30; F21V 9/30
  See application file for complete search history.

(56) References Cited

U.S. PATENT DOCUMENTS

| | | | | |
|---|---|---|---|---|
| 7,196,354 B1* | 3/2007 | Erchak | ............... | H10H 20/8515 257/E25.02 |
| 7,859,175 B2* | 12/2010 | Kurihara | .............. | H05B 33/145 313/111 |
| 8,081,289 B2* | 12/2011 | Lin | ................... | G02F 1/133609 385/141 |
| 8,253,330 B2* | 8/2012 | Hwu | ....................... | F21V 31/00 313/506 |
| 10,365,551 B2* | 7/2019 | Nagasaki | ................ | F21V 13/14 |
| 10,458,623 B2* | 10/2019 | Tomita | ................. | G02B 5/0858 |
| 2016/0102820 A1* | 4/2016 | Chang | ................. | G02B 5/0816 362/343 |

FOREIGN PATENT DOCUMENTS

| | | | | |
|---|---|---|---|---|
| CN | 206929725 U | * | 1/2018 | |
| CN | 110017435 A | * | 7/2019 | ............... F21K 9/20 |
| EP | 2312346 A1 | * | 4/2011 | ....... B29D 11/00788 |
| WO | WO-2017217486 A1 | * | 12/2017 | ............. C09K 11/00 |
| WO | WO-2019056584 A1 | * | 3/2019 | ............... F21K 9/64 |

* cited by examiner

*Primary Examiner* — Ismael Negron
(74) *Attorney, Agent, or Firm* — Pilloff Passino & Cosenza LLP; Rachel K. Pilloff; Sean A. Passino

(57) ABSTRACT

The multilayered fluorescent wafer includes a fluorescent glass layer, a metal reflective film layer with high reflectivity, a sealing silver paste layer with high thermal conductivity, and a metal substrate layer, the layers disposed sequentially from top to bottom.

10 Claims, 5 Drawing Sheets

MULTILAYERED FLUORESCENT WAFER FOR LASER LIGHTING AND DISPLAY, AND METHOD OF MANUFACTURING

CROSS-REFERENCE TO RELATED APPLICATIONS

This application claims priority to Chinese Patent Application No. 202410481411.0, filed on Apr. 19, 2024, the contents of which are hereby incorporated by reference.

TECHNICAL FIELD

The present disclosure belongs to the technical field of laser lighting and display, and in particular to a multilayer-structured fluorescent wafer for laser lighting and display and a preparation method thereof.

BACKGROUND

White Light Emitting Diode (LED) lighting based on blue LED chips has the advantages of high luminous efficiency, long service life, energy saving and environmental protection. However, the blue LED chips suffer from the problem of efficiency droop, i.e., when the injection current rises to a certain threshold, the luminous efficiency of the blue LED chip will drop sharply. As a result, the application of white LED lighting technology in areas requiring ultra-high-power and high-brightness illumination, such as automobile headlights, aviation lighting, large-size displays, high-brightness projectors and so on, is greatly restricted.

For the efficiency droop problem of blue LED chips, researchers have developed a new blue laser diode (LD) chip. An ideal white light source may also be obtained by replacing blue LEDs with blue LDs as the excitation light source. Unlike LED chips, LD chips based on stimulated radiation do not have the obvious "efficiency droop" problem, so that ultra-high-power and high-brightness lighting may be realized by increasing the injection current. The white light source obtained based on blue LD has the advantages of good monochromaticity, strong directionality, high optical power density, etc. It may not only increase the projection distance and improve the safety, but also has a smaller size and a more compact structure. The researchers believe that the blue LED technology in the near future will be limited by the physical limit of its luminous efficiency, and eventually be replaced by blue LD technology, and the laser lighting based on blue LD will be an inevitable choice to realize ultra-high-power and high-brightness illumination, featuring a broad application prospect and great economic benefits.

Laser lighting is generated by excitation of fluorescent conversion materials using blue light LD to produce white light, and the existing fluorescent conversion materials for laser lighting usually use the same technical solutions as white light LEDs, i.e., using organic encapsulation materials and phosphor powder for composite to obtain fluorescent conversion materials, whereby the organic encapsulation materials used are mainly epoxy resins and organic silicone, etc., and these organic encapsulation materials are characterized by good plasticity and cost-effectiveness. However, laser lighting uses laser as an excitation light source, and the energy distribution of the laser spot is very concentrated. With the increase of laser power density, the smaller laser radiation spot makes the heat generated by the irradiated fluorescent glass rise rapidly, and the local heat flux density may be higher than 800 Watts per square centimeter ($W·cm^{-2}$), causing the thermal aggregation effect to be very serious, which may result in the saturation of the fluorescence in the region, or even fluorescence quenching. As the power of blue light LD continues to increase, a series of problems have been gradually exposed to the traditional organic packaging materials, such as low thermal conductivity (0.1-0.4 watt per kelvin-meter, $W·m^{-1}·K^{-1}$), poor aging resistance, thermal-induced aging, as well as a yellowish color and reduced transmittance of the organic packaging materials under high optical power density laser excitation, which may lead to a fluorescence thermal quenching, resulting in a significant decrease in the excitation efficiency, and ultimately leading to light degradation and color deviation of white light sources, severely limiting the development of white light LD lighting devices.

To address the above issues, the researchers are seeking all-inorganic encapsulation materials as a novel solution for LD encapsulation in recent years. Compared with organic encapsulation materials such as epoxy resin or organic silica gel, all-inorganic fluorescent conversion materials have natural advantages in terms of aging resistance, chemical stability and resistance to laser irradiation. Reported all-inorganic fluorescent conversion materials that may be used for laser illumination mainly include fluorescent single crystal, fluorescent ceramics, fluorescent film and fluorescent glass, etc. Among them, fluorescent glass has the advantages of adjustable component, controllable refractive index, simple preparation process, and compoundable with all kinds of phosphor powders, and has attracted extensive attention of researchers owing to the great application prospect in the field of high-power laser lighting and display.

Fluorescent glass is an all-inorganic fluorescent conversion material with phosphor powder uniformly doped into matrix glass, which has the advantages of high luminescence efficiency, high mechanical strength, adjustable coefficient of thermal expansion, and good chemical and thermal stability. However, owing to the low thermal conductivity (about 1 $W·m^{-1}·K^{-1}$) and poor heat dissipation performance of the fluorescent glass itself, the heat generated upon irradiation by a high-power laser is not promptly exported, resulting in an excessively high operating temperature and causing fluorescence saturation phenomenon, thus limiting the application of fluorescent glass in high-power laser lighting and display.

For the problems of heat dissipation encountered in laser lighting and display, the existing technical solutions mainly use passive heat dissipation or active split heat dissipation, such as a high-brightness laser lighting device disclosed in Chinese Patent CN218468847U, which mixes heat-conducting materials in the phosphor powder mixture to diffuse the heat generated into the surrounding environment, but this program uses organic silicone as a bonding material and with an obvious heat-conducting barrier layer, and therefore makes the overall heat conduction and dissipation capability poor. Chinese patent CN116082029A discloses a method for preparing fluorescent device for reflective laser illumination, in which phosphor powder is mixed with glass powder and sintered on a copper substrate, but the low reflectivity of the copper substrate leads to a significant decrease in the overall luminous efficacy. Chinese patent CN108527960A discloses a fluorescent ceramic and sapphire compound ceramic material and preparation method thereof, including a fluorescent ceramic layer, a sapphire layer, and a connecting layer, with the connecting layer being quartz glass, aluminate glass, or borate glass; the connecting layer in the middle of the sapphire high thermal conductivity substrate and the luminescent material in this scheme is a glass material, which seriously hinders the thermal conductivity and heat dissipation process due to the low thermal conductivity rate of the glass, and still fails to effectively solve the heat dissipation problem. Chinese patent CN116667137A discloses a microchannel integrated heat dissipation phosphor, which adopts the active heat dissipation method of microfluidic channel to disperse the heat generated during operation, but a liquid cooling pump needs to be accessed to realize the operation, which is complicated in structure and expensive in production cost.

SUMMARY

Aiming at the problems of low luminous efficiency, difficult thermal dissipation and low fluorescence saturation threshold existing in the present laser lighting and display technology, the present disclosure provides a multilayer-structured fluorescent wafer for laser lighting and display and a preparation method thereof.

In order to achieve the above objectives, the present disclosure provides a multilayer-structured fluorescent wafer for laser lighting and display, including a fluorescent glass layer, a metal reflective film layer, a sealing silver paste layer, and a metal substrate layer in order from top to bottom.

Optionally, a thickness of the fluorescent glass layer is 0.1 milliliter (mm) to 0.4 mm.

Optionally, a fluorescent glass layer includes quartz glass powder and phosphor powder, where a doping concentration of the phosphor powder is 60 weight percentage (wt %)-90 wt %, preferably 80 wt %-90 wt %.

More optionally, the quartz glass powder is nano-silica powder with a particle size of 400-900 nano-meters (nm).

Optionally, a thickness of the metal reflective film layer is 100-300 nm.

More optionally, a material of the metal reflective film layer is a metal material including pure silver, pure aluminum or pure chromium.

Optionally, a thickness of the sealing silver paste layer is 100-200 micrometers (m).

Optionally, a main component of the sealing silver paste is high-purity metallic silver particulates, and preferably, a silver content is 80%-90%.

Optionally, a material of the metal substrate layer is copper or aluminum alloy; and a thickness of the metal substrate layer is 1-2 mm.

Fluorescent glass is used as the fluorescence conversion layer to convert blue laser into fluorescence of other wavelengths; the metal reflective film layer reflects the converted fluorescence upwards to improve the luminous efficiency of the fluorescent glass; the silver paste is used to seal the fluorescent glass coated with metal reflective film and the metal substrate together, so as to achieve good thermal conductivity; and the metal substrate in the lowest layer is mainly used to improve the overall heat dissipation efficiency.

The present disclosure also provides a method for preparing the multilayer-structured fluorescent wafer for laser lighting and display, including following steps:

S1, mixing and grinding the phosphor powder and quartz glass powder according to a mass ratio, and then performing spark plasma sintering (SPS) or hot pressing sintering to obtain the fluorescent glass layer;

S2, polishing one side of the fluorescent glass layer, coating a metal reflective film layer on a polished side of the fluorescent glass by magnetron sputtering or thermal vapor deposition process;

S3, coating a silver sealing paste on an upper surface of the metal substrate to obtain a metal substrate layer having a sealing silver paste layer; and S4, laminating a side of the fluorescent glass layer having a metal reflective film layer to a side of the metal substrate layer having a sealing silver paste layer, followed by heating and laminating firstly and then curing and sintering, and obtaining the multilayer-structured fluorescent wafer for laser lighting and display.

Optionally, a duration for mixing and grinding the phosphor powder and the glass powder is 15-20 minutes (min).

Optionally, the SPS is carried out in a vacuum environment of 1050-1200 degrees Celsius (° C.), with a pressure of 50 megapascals (MPa) and a duration of 10-15 min.

Optionally, the hot pressing sintering is carried out in a vacuum environment of 1100° C., with a sintering pressure of 70 MPa, and a sintering duration of 15-20 min.

Optionally, one side of the fluorescent glass layer is polished to a roughness Ra of less than 0.05 μm.

Optionally, a temperature of the heating is 120° C. and a duration is 2 hours (h).

Optionally, the curing sintering is carried out in a protective atmosphere at a sintering temperature of 450° C. for 1 h.

Compared with the prior art, the present disclosure has the following advantages and technical effects.

In the present disclosure, the metal reflective film with high reflective property is plated on the lower surface of the fluorescent glass, so that direct sealing between the fluorescent glass and the metal substrate is avoided, and the converted fluorescent light may be reflected upwards, thus effectively improving the luminous efficiency of the fluorescent glass.

Silver paste with high thermal conductivity is used as the sealing material, which avoids the problem of thermal conductivity blocking layer formed by using epoxy resin or organic silica gel, thus improving the thermal conductivity efficiency and greatly increasing the fluorescence saturation threshold of the fluorescent wafer, and in turn greatly increasing the fluorescence saturation power threshold of the light source device for laser lighting and display.

The fluorescent glass is made by compounding quartz glass and phosphor powder. As quartz glass has good thermal conductivity, small coefficient of thermal expansion and excellent physical and chemical properties compared with other glass systems, the performance of heat conduction and dissipation of the fluorescent film itself is improved, and the anti-laser damage performance of the fluorescent film is also improved effectively.

To sum up, the multilayer-structured fluorescent wafer provided by the present disclosure has the characteristics of high luminous efficiency, good thermal conductivity, high fluorescence saturation threshold and strong laser damage resistance, and is suitable for the field of laser lighting and display of high-power density.

BRIEF DESCRIPTION OF THE DRAWINGS

The accompanying drawings, which constitute a part of this application, are used to provide a further understanding of this application. The illustrative embodiments of this application and their descriptions are used to explain this application, and do not constitute an improper limitation of this application. In the attached drawings.

DETAILED DESCRIPTION OF THE EMBODIMENTS

A number of exemplary embodiments of the present disclosure will now be described in detail, and this detailed description should not be considered as a limitation of the present disclosure, but should be understood as a more detailed description of certain aspects, characteristics and embodiments of the present disclosure.

It should be understood that the terminology described in the present disclosure is only for describing specific embodiments and is not used to limit the present disclosure. In addition, for the numerical range in the present disclosure, it should be understood that each intermediate value between the upper limit and the lower limit of the range is also specifically disclosed. The intermediate value within any stated value or stated range and every smaller range between any other stated value or intermediate value within the stated range are also included in the present disclosure. The upper and lower limits of these smaller ranges can be independently included or excluded from the range.

Unless otherwise specified, all technical and scientific terms used herein have the same meaning as commonly understood by one of ordinary skill in the art to which this present disclosure relates. Although the present disclosure only describes the preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes can be made to the specific embodiments of the present disclosure without departing from the scope or spirit of the present disclosure. Other embodiments will be apparent to the skilled person from the description of the present disclosure. The description and embodiments of the present disclosure are exemplary only.

The terms "including", "comprising", "having" and "containing" used in this specification are all open terms, which means including but not limited to.

Figure 1:
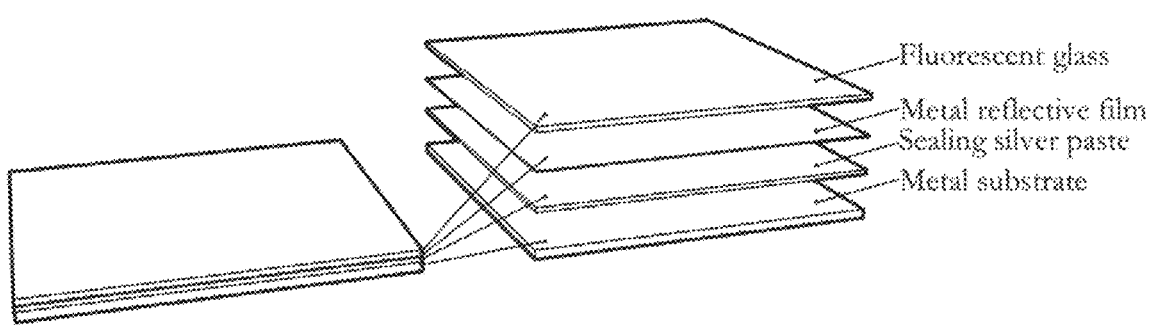
FIG. 1 is a structural schematic diagram of a multilayer-structured fluorescent wafer for laser lighting and display of the present disclosure.

The embodiments of the present disclosure provide a multilayer-structured fluorescent wafer for laser lighting and display, which sequentially includes a fluorescent glass layer, a metal reflective film layer, a sealing silver paste layer and a metal substrate layer from top to bottom, and the structural schematic diagram of the multilayer-structured fluorescent wafer for laser lighting and display is shown in FIG. 1.

In a preferred embodiment of the present disclosure, a thickness of the fluorescent glass layer is 0.1 mm to 0.4 mm.

In a preferred embodiment of the present disclosure, the fluorescent glass layer includes quartz glass powder and phosphor powder, where the phosphor powder is LuYAG:$Ce^{3+}$ phosphor powder with a doping concentration of 60 wt %-90 wt %, more preferably 80 wt %-90 wt %, and the quartz glass powder is nano-silica powder or silica-based molecular sieve SBA-15 with a particle size of 400-900 nm.

In a preferred embodiment of the present disclosure, a thickness of the metal reflective film layer is 100-300 nm.

In a preferred embodiment of the present disclosure, the metal reflective film layer is made of metal materials such as pure silver, pure aluminum or pure chromium.

In a preferred embodiment of that present disclosure, a thickness of the sealing silver paste lay is 100-200 µm.

In a preferred embodiment of the present disclosure, main components of the sealing silver paste are high-purity metallic silver particulates, and preferably, a silver content is 80%-90%.

In a preferred embodiment of the present disclosure, a material of the metal substrate layer is copper or aluminum alloy.

In a preferred embodiment of the present disclosure, a thickness of the metal substrate layer is 1-2 mm.

Figure 5:
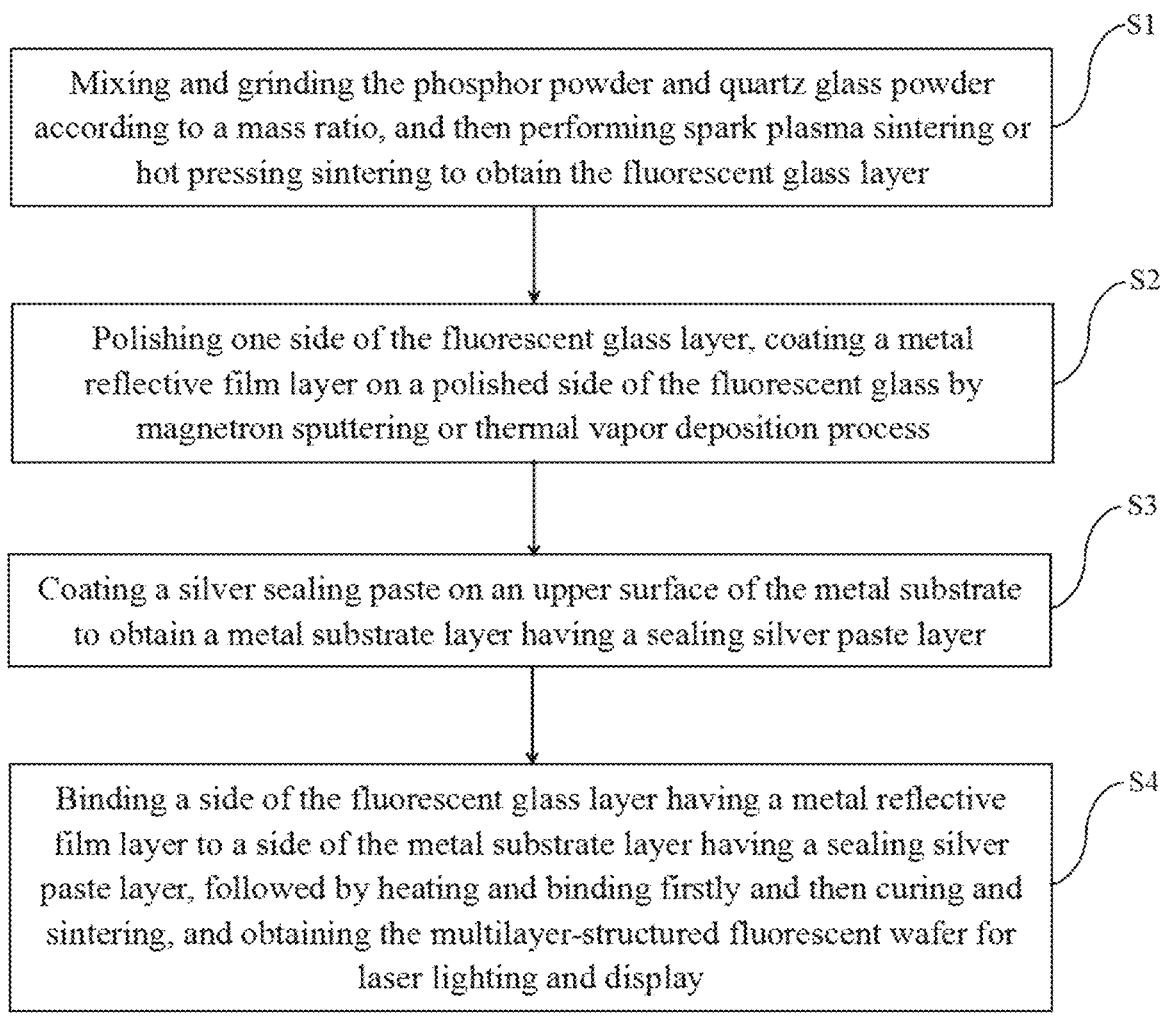
FIG. 5 is a process illustrating a method for preparing the multilayer-structured fluorescent wafer for laser lighting and display of the present disclosure.

The embodiments of the present disclosure also provide a method for preparing the multilayer-structured fluorescent wafer for laser lighting and display, including the following steps as shown in FIG. 5:

S1, mixing and grinding the phosphor powder and quartz glass powder in an agate mortar according to a mass ratio, and then putting into a graphite mold for spark plasma sintering (SPS) or hot pressing sintering to obtain a fluorescent glass layer;

S2, polishing one side of the fluorescent glass layer, coating a metal reflective film layer on a polished side of the fluorescent glass by magnetron sputtering or thermal vapor deposition process;

S3, coating a silver sealing paste on an upper surface of the metal substrate to obtain a metal substrate layer having a sealing silver paste layer; and S4, laminating a side of the fluorescent glass layer having the metal reflective film layer to a side of the metal substrate layer having the sealing silver paste layer, followed by heating and laminating firstly and then curing and sintering, and obtaining the multilayer-structured fluorescent wafer for laser lighting and display.

In a preferred embodiment of the present disclosure, a duration for mixing and grinding the phosphor powder and the glass powder is 15-20 minutes (min).

In a preferred embodiment of the present disclosure, the spark plasma sintering is carried out in a vacuum environment of 1050-1200° C., with a pressure of 50 megapascals (MPa) and a duration of 10-15 min.

In a preferred embodiment of the present disclosure, the hot pressing sintering is carried out in a vacuum environment of 1100° C., with a sintering pressure of 70 MPa, and a sintering duration of 15-20 min.

In a preferred embodiment of the present disclosure, one side of the fluorescent glass layer is polished to a roughness Ra of less than 0.05 µm.

In a preferred embodiment of the present disclosure, a temperature of the heating is 120° C. and a duration is 2 hours (h).

In a preferred embodiment of the present disclosure, the curing and sintering are carried out in a protective atmosphere at a sintering temperature of 450° C. for 1 h.

Unless otherwise specified, the experimental methods and detection methods described in the embodiments of the present disclosure are all conventional methods; and the reagents and materials used, if not otherwise specified, are obtained by commercial purchase.

The room temperature in the embodiments of the present disclosure refers to "25+/−2° C.".

The technical schemes of the present disclosure are further explained by embodiments.

Embodiment 1

According to a mass percentage, 75% of phosphor powder (LuYAG:$Ce^{3+}$ phosphor powder) and 25% of quartz glass powder (porous silica microspheres with a particle size of 400-900 nm) are put into an agate mortar, mixed and ground for 15 min, and the mixed powders are loaded into a graphite mold and subjected to SPS under vacuum environment at 1050° C. with a sintering pressure of 50 MPa for 15 min, and the pressure is maintained throughout the process to obtain the fluorescent glass layer;
the sintered fluorescent glass samples are taken out and cut with a diamond wire cutter to obtain the fluorescent glass blanks, and the fluorescent glass blanks are ground and thinned to 0.4 mm to obtain the fluorescent glass layer;
one side of the fluorescent glass layer is polished so that the roughness Ra is less than 0.05 μm, and a pure silver metal reflective film layer with a thickness of 100 nm is coated on the polished side of the fluorescent glass using magnetron sputtering process;
pure copper substrate with thickness of 1 mm is selected, the substrate is ultrasonically cleaned to remove oil contamination, and oxides are removed from the upper and lower surfaces by mechanical grinding to ensure the flatness, and the upper surface of the metal substrate is coated with sealing silver paste, and the silver paste is selected to be medium-temperature sintering silver paste with a silver content of 80%, and the thickness of the silver paste is controlled to be 150 μm by a scraper, so as to obtain the metal substrate layer containing the sealing silver paste layer; and
the side of the fluorescent glass layer that has a metal reflective film layer is laminated to the side of the metal substrate layer that has a sealing silver paste layer using a pressure-holding laminator, and the heating temperature is set to 120° C. for 2 h; the laminated fluorescent wafer is sintered in a muffle furnace at 450° C. in a protective atmosphere of $N_2$ (high purity nitrogen) for 1 h and then cooled down to room temperature to obtain a multilayer-structured fluorescent wafer for laser lighting and display.

Embodiment 2

According to a mass percentage, 60% of phosphor powder (LuYAG:$Ce^{3+}$ phosphor powder) and 40% of quartz glass powder (porous silica microspheres with a particle size of 400-900 nm) are put into an agate mortar, mixed and ground for 20 min, and the mixed powders are loaded into a graphite mold and subjected to SPS under vacuum environment at 1100° C. with a sintering pressure of 50 MPa for 10 min, and the pressure is maintained throughout the process to obtain the fluorescent glass layer;
the sintered fluorescent glass samples are taken out and cut with a diamond wire cutter to obtain the fluorescent glass blanks, which are ground and thinned to 0.4 mm to obtain the fluorescent glass layer;
one side of the fluorescent glass layer is polished so that the roughness Ra is less than 0.05 μm, and a pure silver metal reflective film layer with a thickness of 300 nm is coated on the polished side of the fluorescent glass using magnetron sputtering process;
aluminum alloy substrate with thickness of 2 mm is selected, the substrate is ultrasonically cleaned to remove oil contamination, and oxides are removed from the upper and lower surfaces by mechanical grinding to ensure the flatness, and the upper surface of the metal substrate is coated with sealing silver paste, and the silver paste is selected to be medium-temperature sintering silver paste with a silver content of 90%, and the thickness of the silver paste is controlled to be 100 μm by a scraper, so as to obtain the metal substrate layer containing the sealing silver paste layer; and
the side of the fluorescent glass layer that has a metal reflective film layer is laminated to the side of the metal substrate layer that has a sealing silver paste layer using a pressure-holding laminator, and the heating temperature is set to 120° C. for 2 h; the laminated fluorescent wafer is sintered in a muffle furnace at 450° C. in a protective atmosphere of $N_2$ (high purity nitrogen) for 1 h and then cooled down to room temperature to obtain a multilayer-structured fluorescent wafer for laser lighting and display.

Embodiment 3

According to a mass percentage, 90% of phosphor powder (LuYAG:$Ce^{3+}$ phosphor powder) and 10% of quartz glass powder (silica-based molecular sieve SBA-15 with a particle size of 400-900 nm) are put into an agate mortar, mixed and ground for 16 min, and the mixed powders are loaded into a graphite mold and subjected to hot pressing sintering under vacuum environment at 1100° C. with a sintering pressure of 70 MPa for 20 min, and the pressure is maintained throughout the process to obtain the fluorescent glass layer;
the sintered fluorescent glass samples are taken out and cut with a diamond wire cutter to obtain the fluorescent glass blanks, which are ground and thinned to 0.3 mm to obtain the fluorescent glass layer;
one side of the fluorescent glass layer is polished so that the roughness Ra is less than 0.05 μm, and a pure aluminum metal reflective film layer with a thickness of 200 nm is coated on the polished side of the fluorescent glass using magnetron sputtering process;
pure copper substrate with thickness of 1.5 mm is selected, the substrate is ultrasonically cleaned to remove oil contamination, and oxides are removed from the upper and lower surfaces by mechanical grinding to ensure the flatness, and the upper surface of the metal substrate is coated with sealing silver paste, and the silver paste is selected to be medium-temperature sintering silver paste with a silver content of 85%, and the thickness of the silver paste is controlled to be 150 μm by scraper, so as to obtain the metal substrate layer containing the sealing silver paste layer; and
the side of the fluorescent glass layer that has a metal reflective film layer is laminated to the side of the metal substrate layer that has a sealing silver paste layer using a pressure-holding laminator, and the heating temperature is set to 120° C. for 2 h; the laminated fluorescent wafer is sintered in a muffle furnace at 450° C. in a protective atmosphere of N$_2$ (high purity nitrogen) for 1 h and then cooled down to room temperature to obtain a multilayer-structured fluorescent wafer for laser lighting and display.

Embodiment 4

According to the mass percentage, 80% of phosphor powder (LuYAG:Ce$^{3+}$ phosphor powder) and 20% of quartz glass powder (silica-based molecular sieve SBA-15, with particle size of 400-900 nm) are put into agate mortar, mixed and ground for 15 min, then the mixed powders are put into graphite mold, and subjected to hot pressing sintering under vacuum environment at 1100° C. with a sintering pressure of 70 MPa for 15 min, and the pressure is maintained throughout the process to obtain the fluorescent glass layer;

the sintered fluorescent glass samples are taken out and cut with a diamond wire cutter to obtain the fluorescent glass blanks, which are ground and thinned to 0.2 mm to obtain the fluorescent glass layer;

one side of the fluorescent glass layer is polished so that the roughness Ra is less than 0.05 μm, and a pure chromium metal reflective film layer with a thickness of 200 nm is coated on the polished side of the fluorescent glass using magnetron sputtering process;

pure copper substrate with thickness of 2 mm is selected, the substrate is ultrasonically cleaned to remove oil contamination, and oxides are removed from the upper and lower surfaces by mechanical grinding to ensure the flatness, and the upper surface of the metal substrate is coated with sealing silver paste, and the silver paste is selected to be medium-temperature sintering silver paste with a silver content of 90%, and the thickness of the silver paste is controlled to be 150 μm by a scraper, so as to obtain the metal substrate layer containing the sealing silver paste layer; and the side of the fluorescent glass layer that has a metal reflective film layer is laminated to the side of the metal substrate layer that has a sealing silver paste layer using a pressure-holding laminator, and the heating temperature is set to 120° C. for 2 h; the laminated fluorescent wafer is sintered in a muffle furnace at 450° C. in a protective atmosphere of N$_2$ (high purity nitrogen) for 1 h and then cooled down to room temperature to obtain a multilayer-structured fluorescent wafer for laser lighting and display.

Embodiment 5

According to the mass percentage, 75% of phosphor powder (LuYAG:Ce$^{3+}$ phosphor powder) and 25% of quartz glass powder (silica-based molecular sieve SBA-15, with particle size of 400-900 nm) are put into agate mortar, mixed and ground for 15 min, then the mixed powders are put into graphite mold, and subjected to hot pressing sintering under vacuum environment at 1200° C. with a sintering pressure of 70 MPa for 15 min, and the pressure is maintained throughout the process to obtain the fluorescent glass layer;

the sintered fluorescent glass samples are taken out and cut with a diamond wire cutter to obtain the fluorescent glass blanks, which are ground and thinned to 0.1 mm to obtain the fluorescent glass layer;

one side of the fluorescent glass layer is polished so that the roughness Ra is less than 0.05 μm, and a pure chromium metal reflective film layer with a thickness of 100 nm is coated on the polished side of the fluorescent glass using magnetron sputtering process;

aluminum alloy substrate with thickness of 1.5 mm is selected, the substrate is ultrasonically cleaned to remove oil contamination, and oxides are removed from the upper and lower surfaces by mechanical grinding to ensure the flatness, and the upper surface of the metal substrate is coated with sealing silver paste, and the silver paste is selected to be medium-temperature sintering silver paste with a silver content of 80%, and the thickness of the silver paste is controlled to be 100 μm by a scraper, so as to obtain the metal substrate layer containing the sealing silver paste layer; and the side of the fluorescent glass layer that has a metal reflective film layer is laminated to the side of the metal substrate layer that has a sealing silver paste layer using a pressure-holding laminator, and the heating temperature is set to 120° C. for 2 h; the laminated fluorescent wafer is sintered in a muffle furnace at 450° C. in a protective atmosphere of N$_2$ (high purity nitrogen) for 1 h and then cooled down to room temperature to obtain a multilayer-structured fluorescent wafer for laser lighting and display.

Comparative Embodiment 1

Same as Embodiment 1, differing only in that a fluorescent glass wafer not coated with a metal reflective film is encapsulated onto the substrate by means of an organic die-bond adhesive, which is prepared as follows:

according to a mass percentage, 75% of phosphor powder (LuYAG:Ce$^{3+}$ phosphor powder) and 25% of quartz glass powder (porous silica microspheres with a particle size of 400-900 nm) are put into an agate mortar, mixed and ground for 15 min, and the mixed powders are loaded into a graphite mold and subjected to SPS under vacuum environment at 1050° C. with a sintering pressure of 50 MPa for 15 min, and the pressure is maintained throughout the process to obtain the fluorescent glass layer; one side of the fluorescent glass layer is polished so that the roughness Ra is less than 0.05 μm;

the sintered fluorescent glass samples are taken out and cut with a diamond wire cutter to obtain the fluorescent glass blanks, which are ground and thinned to 0.4 mm to obtain the fluorescent glass layer;

pure copper substrate with thickness of 1 mm is selected, the substrate is ultrasonically cleaned to remove oil contamination, and oxides are removed from the upper and lower surfaces by mechanical grinding to ensure the flatness, an organic die-bond adhesive (purchased from Shinetsu, Japan) is coated on the surface of the metal substrate, and the thickness of the organic die-bond adhesive is controlled to be 150 μm by a scraper to obtain a metal substrate layer containing the organic die-bond adhesive layer;

the polished surface of the fluorescent glass layer and one surface of the organic die-bond adhesive layer of the metal substrate layer are bonded by using a pressure-holding laminator, and the temperature for heating and curing is set at 120° C. for 2 h, so that a multilayer-structured fluorescent wafer for laser lighting and display is obtained.

Comparative Embodiment 2

Same as Embodiment 1, differing only in that a fluorescent glass wafer not coated with a metal reflective film is encapsulated onto the substrate by means of silver paste, specifically:

according to the mass percentage, 75% of phosphor powder (LuYAG:Ce$^{3+}$ phosphor powder) and 25% of quartz glass powder (porous silica microspheres with particle size of 400-900 nm) are put into an agate mortar, mixed and ground for 15 min, and the mixed powder is put into a graphite mold, and subjected to SPS under vacuum environment at 1050° C. with a sintering pressure of 50 MPa for 15 min, and the pressure is maintained throughout the process to obtain the fluorescent glass layer;

the sintered fluorescent glass samples are taken out and cut with a diamond wire cutter to obtain the fluorescent glass blanks, which are ground and thinned to 0.4 mm to obtain the fluorescent glass layer;

one side of the fluorescent glass layer is polished so that the roughness Ra is less than 0.05 μm;

pure copper substrate with thickness of 1 mm is selected, the substrate is ultrasonically cleaned to remove oil contamination, and oxides are removed from the upper and lower surfaces by mechanical grinding to ensure the flatness, and the upper surface of the metal substrate is coated with sealing silver paste, and the silver paste is selected to be medium-temperature sintering silver paste, and the thickness of the silver paste is controlled to be 150 μm by a scraper, so as to obtain the metal substrate layer containing the sealing silver paste layer; and the polished surface of the fluorescent glass layer is bonded to the surface of the metal substrate containing the sealing silver paste layer by using a pressure-holding laminator, the heating temperature is set at 120° C. for 2 h, and the bonded fluorescent wafer is sintered in a muffle furnace at 450° C. in N$_2$ (high purity nitrogen) protective atmosphere for 1 h, and then cooled to room temperature to obtain a multilayer-structured fluorescent wafer.

Performance Test

Figure 2:
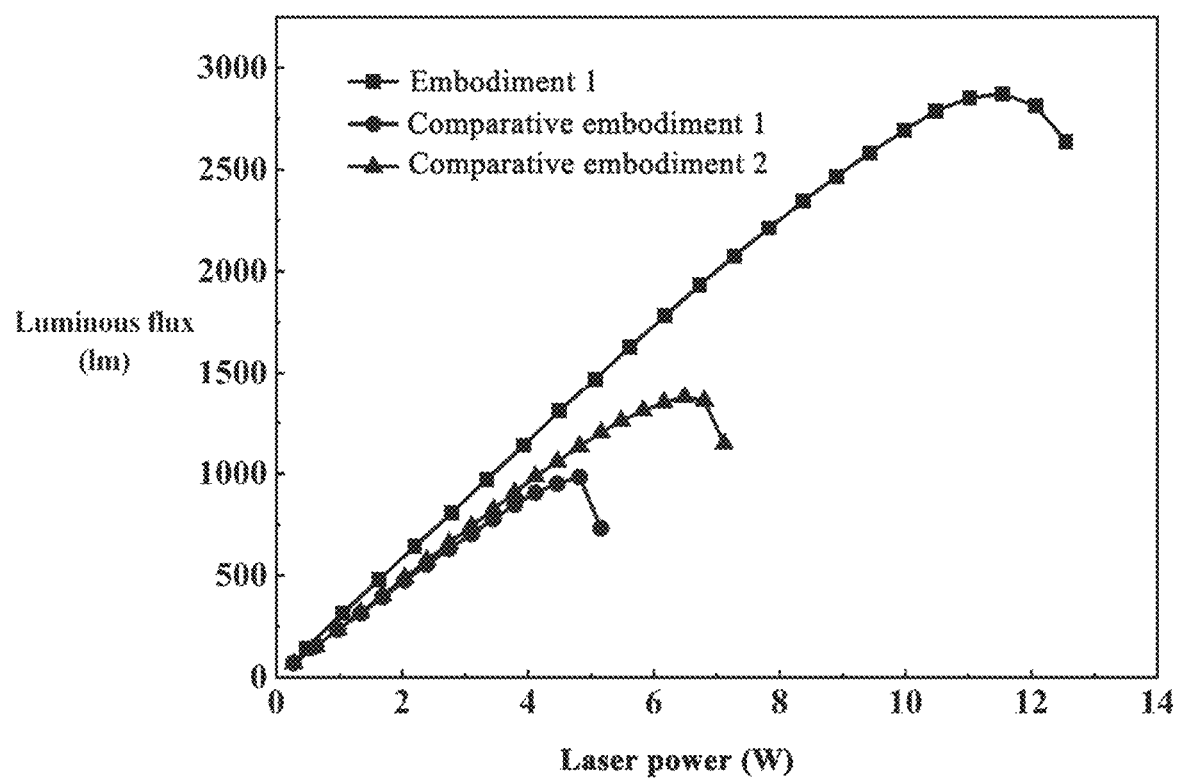
FIG. 2 shows the measurement results of luminous flux of fluorescent wafers obtained in Embodiment 1 and Comparative embodiments 1 and 2.
Figure 3:
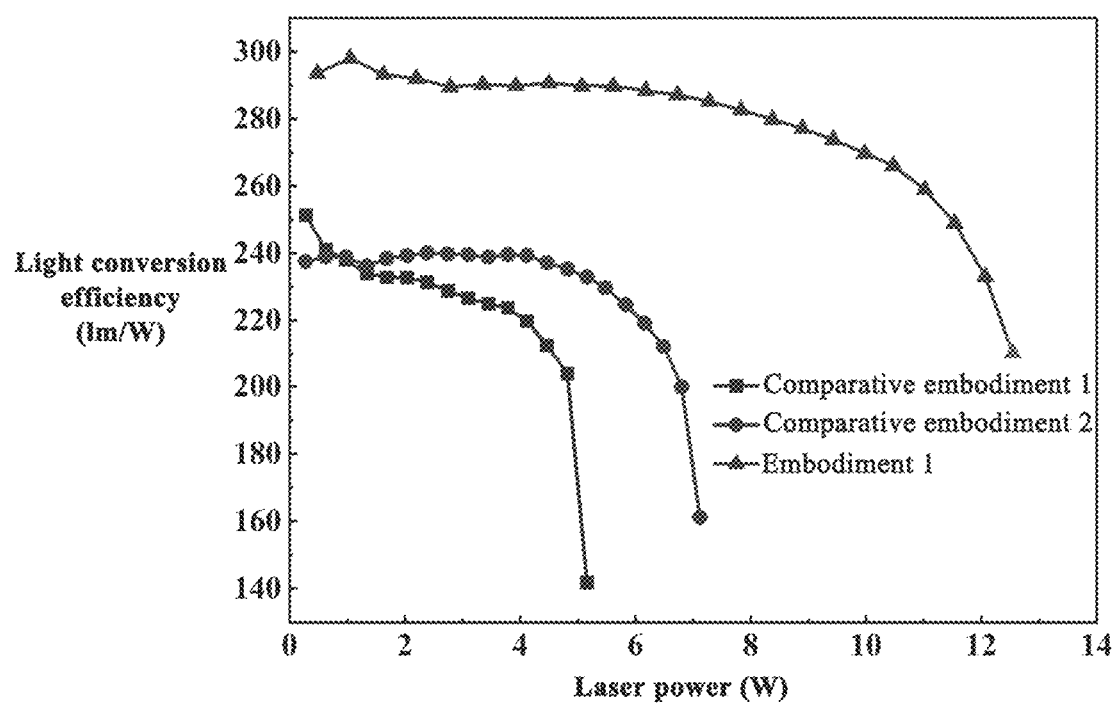
FIG. 3 shows the measurement results of light conversion efficiency of fluorescent wafers obtained in Embodiment 1 and Comparative embodiments 1 and 2.

The measurement results of luminous flux and light conversion efficiency of the fluorescent wafers obtained in Embodiment 1 and Comparative embodiments 1 and 2 are shown in FIG. 2 and FIG. 3. From FIG. 2 and FIG. 3, it is observed that the multilayer-structured fluorescent wafer prepared by the process given in Embodiment 1 has a fluorescence saturation power threshold increased from 5.5 W to 11 W, and the light conversion efficiency increased by 22% under the irradiation of 4 W laser, in comparison with the metal-free reflective film, the organic die-bond adhesive bonded fluorescent wafer of Comparative embodiment 1; and as compared to the metal-free reflective film fluorescent wafer of Comparative embodiment 2, the light conversion efficiency is improved by 20% under 4 W laser irradiation, and the fluorescence saturation threshold is improved from 7 W to 11 W, with the higher threshold also indicating better thermal conductivity.

Figure 4:
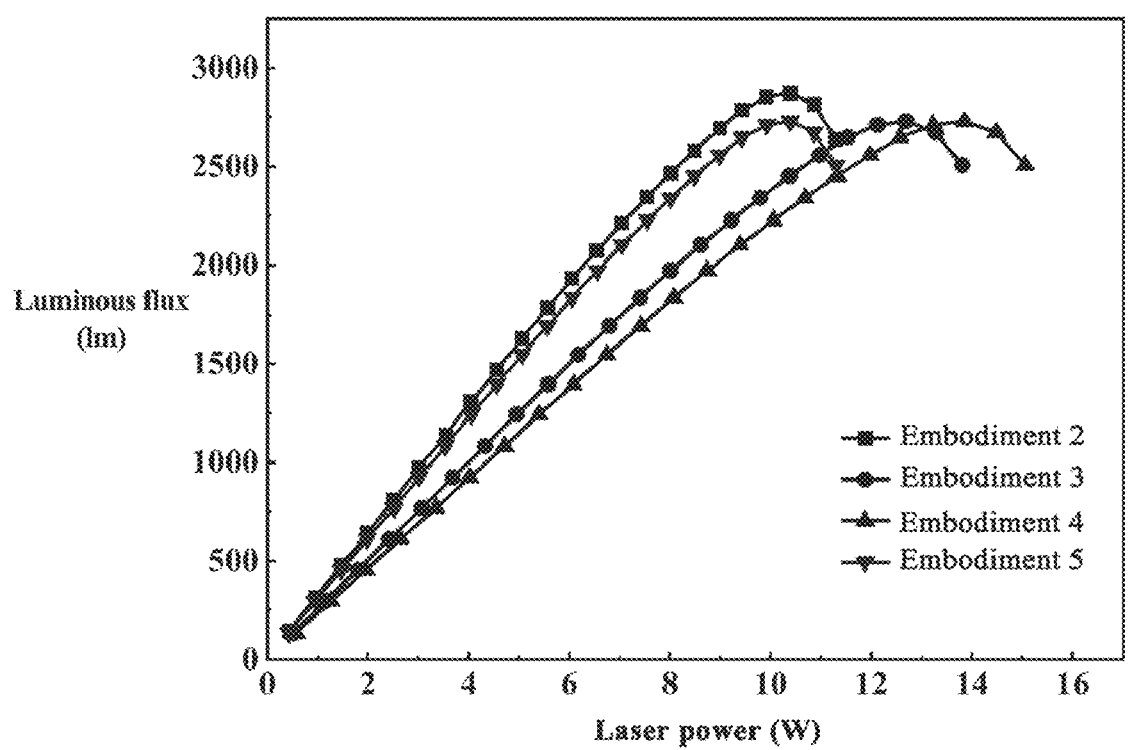
FIG. 4 illustrates the measurement results of luminous flux of the fluorescent wafers obtained in Embodiments 2-5.

The measurement results of luminous flux of the fluorescent wafers obtained in Embodiments 2-5 are shown in FIG. 4. Combining FIG. 2-FIG. 4, it is observed that the multilayer-structured fluorescent wafer provided by the embodiment of the present disclosure is characterized by high luminous efficacy, good thermal conductivity, high fluorescence saturation threshold and strong resistance to laser damage, and is suitable for use in the field of laser lighting and display with high-power density.

The above describes only the preferred embodiments of this application, but the protection scope of this application is not limited to this. Any change or replacement that may be easily thought of by a person familiar with this technical field within the technical scope disclosed in this application should be included in the protection scope of this application. Therefore, the protection scope of this application should be based on the protection scope of the claims.

What is claimed is:

1. A multilayered fluorescent wafer for laser lighting and display, comprising:
    a fluorescent glass layer;
    a metal reflective film layer;
    a sealing silver paste layer; and
    a metal substrate layer,
    wherein the layers are arranged in order from top to bottom.

2. The multilayered fluorescent wafer according to claim 1, wherein a thickness of the metal reflective film layer is 100-300 nanometers.

3. The multilayered fluorescent wafer according to claim 1, wherein a thickness of the sealing silver paste layer is 100-200 micrometers, and a silver content is 80%-90%.

4. The multilayered fluorescent wafer according to claim 1, wherein a material of the metal substrate layer is copper or aluminum alloy, and a thickness of the metal substrate layer is 1-2 millimeter.

5. The multilayered fluorescent wafer according to claim 1, wherein a thickness of the fluorescent glass layer is 0.1 millimeter to 0.4 millimeter.

6. The multilayered fluorescent wafer according to claim 5, wherein a doping concentration of phosphor powder in the fluorescent glass layer is 60 to 90 weight percentage.

7. A method of manufacturing the multilayer-structured fluorescent wafer according to claim 1, comprising following steps:
    S1) mixing and grinding the phosphor powder and quartz glass powder according to a mass ratio, and then performing spark plasma sintering or hot pressing sintering to obtain the fluorescent glass layer;
    S2) polishing one side of the fluorescent glass layer, coating a metal reflective film layer on a polished side of a fluorescent glass by magnetron sputtering or thermal vapor deposition process;
    S3) coating a silver sealing paste on an upper surface of the metal substrate to obtain a metal substrate layer having the sealing silver paste layer; and
    S4) laminating a side of the fluorescent glass layer having the metal reflective film layer to a side of the metal substrate layer having the sealing silver paste layer, followed by heating and laminating firstly and then curing and sintering, and obtaining the multilayer-structured fluorescent wafer for laser lighting and display.

8. The method of manufacturing the multilayer-structured fluorescent wafer according to claim 7, wherein the one side of the fluorescent glass layer is polished until a roughness Ra is less than 0.05 micrometer.

9. The method of manufacturing the multilayer-structured fluorescent wafer according to claim 7, wherein a temperature of the heating is 120 degrees Celsius and a duration is 2 hours.

10. The method of manufacturing the multilayer-structured fluorescent wafer according to claim 7, wherein the curing and sintering are carried out in a protective atmosphere at a sintering temperature of 450 degrees Celsius for 1 hour.

* * * * *